US012591192B2

(12) United States Patent
Murakami et al.

(10) Patent No.: US 12,591,192 B2
(45) Date of Patent: Mar. 31, 2026

(54) IMAGE FORMING APPARATUS AND HEATING METHOD

(71) Applicant: Toshiba Tec Kabushiki Kaisha, Tokyo (JP)

(72) Inventors: Kiyotaka Murakami, Mishima Shizuoka (JP); Kazuhiko Kikuchi, Yokohama Kanagawa (JP); Sasuke Endo, Chigasaki Kanagawa (JP); Masaya Tanaka, Sunto Shizuoka (JP); Ryota Saeki, Sunto Shizuoka (JP); Kousei Miyashita, Sunto Shizuoka (JP); Ryosuke Kojima, Sunto Shizuoka (JP); Yohei Doi, Mishima Shizuoka (JP); Yuki Kawashima, Tokyo (JP); Eiji Shinohara, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 199 days.

(21) Appl. No.: 18/527,176

(22) Filed: Dec. 1, 2023

(65) Prior Publication Data

US 2024/0103414 A1 Mar. 28, 2024

Related U.S. Application Data

(63) Continuation of application No. 17/673,740, filed on Feb. 16, 2022, now Pat. No. 11,868,067, which is a (Continued)

(30) Foreign Application Priority Data

Sep. 20, 2019 (JP) ................................ 2019-171663

(51) Int. Cl.
*G03G 15/20* (2006.01)
*G03G 15/00* (2006.01)

(52) U.S. Cl.
CPC ..... *G03G 15/2039* (2013.01); *G03G 15/5004* (2013.01)

(58) Field of Classification Search
CPC ........... G03G 15/2039; G03G 15/5004; G03G 15/2042; G03G 2215/2035; G03G 15/205
See application file for complete search history.

(56) References Cited

U.S. PATENT DOCUMENTS 5,241,155 A 8/1993 Koh
5,986,242 A 11/1999 Maitani (Continued)

FOREIGN PATENT DOCUMENTS

EP 3276429 B1 1/2018
JP H08044435 A 2/1996

(Continued)

OTHER PUBLICATIONS

Japanese Office Action dated Jun. 4, 2024, mailed in counterpart Japanese Application No. 2023-171574, 9 pages (with translation).

(Continued)

*Primary Examiner* — G.M. A Hyder
(74) *Attorney, Agent, or Firm* — Kim & Stewart LLP

(57) ABSTRACT

A fixing unit or device that can be used in an image forming apparatus includes a first heater element that is formed of a material that increases in electrical resistance with increases in temperature. A controller of the fixing unit is configured to vary a duty ratio of electric power applied to the first heater element during a start-up operation in which the temperature of the first heater element is raised to a target operating temperature. By varying the duty ratio during the start-up operation, changes in the resistance of the first heater element with the heating can be compensated. For (Continued)

example, the duty ratio can be increased during the course of the start-up to achieve the target operating temperature faster.

20 Claims, 16 Drawing Sheets

Related U.S. Application Data continuation of application No. 16/921,861, filed on Jul. 6, 2020, now Pat. No. 11,281,132.

(56) References Cited

U.S. PATENT DOCUMENTS

| | | | | |
|---|---|---|---|---|
| 6,301,454 | B1 * | 10/2001 | Nishida | G03G 15/2003 399/334 |
| 8,126,383 | B2 | 2/2012 | Kagawa | |
| 8,841,587 | B2 | 9/2014 | Tsuruya | |
| 10,114,318 | B2 | 10/2018 | Sako | |
| 11,281,132 | B2 | 3/2022 | Murakami | |
| 2007/0116485 | A1 | 5/2007 | Nishida | |
| 2008/0253791 | A1 | 10/2008 | Chosokabe | |
| 2012/0224878 | A1 | 9/2012 | Ikebuchi | |
| 2013/0188977 | A1 | 7/2013 | Hase | |
| 2014/0003830 | A1 | 1/2014 | Higashi | |
| 2014/0079425 | A1 | 3/2014 | Tanaka | |
| 2015/0055968 | A1 | 2/2015 | Kadowaki | |
| 2015/0071670 | A1 | 3/2015 | Sugiyama | |
| 2016/0357135 | A1 | 12/2016 | Yamamoto | |
| 2019/0235420 | A1 * | 8/2019 | Mochizuki | G03G 15/5004 |
| 2022/0171314 | A1 | 6/2022 | Murakami | |

FOREIGN PATENT DOCUMENTS

| | | | |
|---|---|---|---|
| JP | 2012252127 | A | 12/2012 |
| JP | 2014010394 | A | 1/2014 |
| JP | 2015040937 | A | 3/2015 |
| JP | 2015052669 | A | 3/2015 |
| JP | 2017003675 | A | 1/2017 |
| JP | 2017227689 | A | 12/2017 |
| JP | 2018077265 | A | 5/2018 |

OTHER PUBLICATIONS

Extended European Search Report dated Jan. 28, 2021, mailed in counterpart European Application No. 20191381.1, 8 pages.

* cited by examiner

IMAGE FORMING APPARATUS AND HEATING METHOD

CROSS-REFERENCE TO RELATED APPLICATIONS

This application is a continuation of U.S. patent application Ser. No. 17/673,740, filed on Feb. 16, 2022, which is a continuation of U.S. patent application Ser. No. 16/921,861, filed on Jul. 6, 2020, now U.S. Pat. No. 11,281,132, granted on Mar. 22, 2022, which is based upon and claims the benefit of priority from Japanese Patent Application No. 2019-171663, filed on Sep. 20, 2019, the entire contents of each of which are incorporated herein by reference.

FIELD

Embodiments described herein relate generally to an image forming apparatus and a heating method.

BACKGROUND

There is an on-demand heating device referred to as a film fixing unit. As the material used for a heater in such an on-demand heating device, a "TCR" material may be used in some cases. In this context, "TCR" material refers to a material that has a higher electrical resistance value as its temperature increases. Generally, when an on-demand heating device is used, the power available for use by the on-demand heating device may be predetermined. In this case, the heating must be carried out with the available power. Use of a TCR material makes it possible to reduce power consumption and to reduce temperature rise of a non-sheet-passing portion (that is, a portion which is not contacting a sheet during a particular fixing operation) of the heater. Due to characteristics of the TCR material, electric power used by the heater decreases as the temperature rises. However, there is a problem in that time required for starting (beginning heating) of the on-demand heating device becomes longer.

DETAILED DESCRIPTION

An object of the present disclosure is to reduce the time required for the starting of the heating device while still suppressing power consumption.

According to an embodiment, a fixing unit that can be used in an image forming apparatus includes a first heater element that is formed of a material (a "TCR" material) that increases in electrical resistance with increases in temperature. A controller of the fixing unit is configured to vary a duty ratio of electric power applied to the first heater element during a start-up operation in which the temperature of the first heater element is raised to a target operating temperature.

Hereinafter, a fixing unit, an image forming apparatus, and a heating method according to certain example embodiments will be described with reference to the drawings.

First Embodiment

Figure 1:
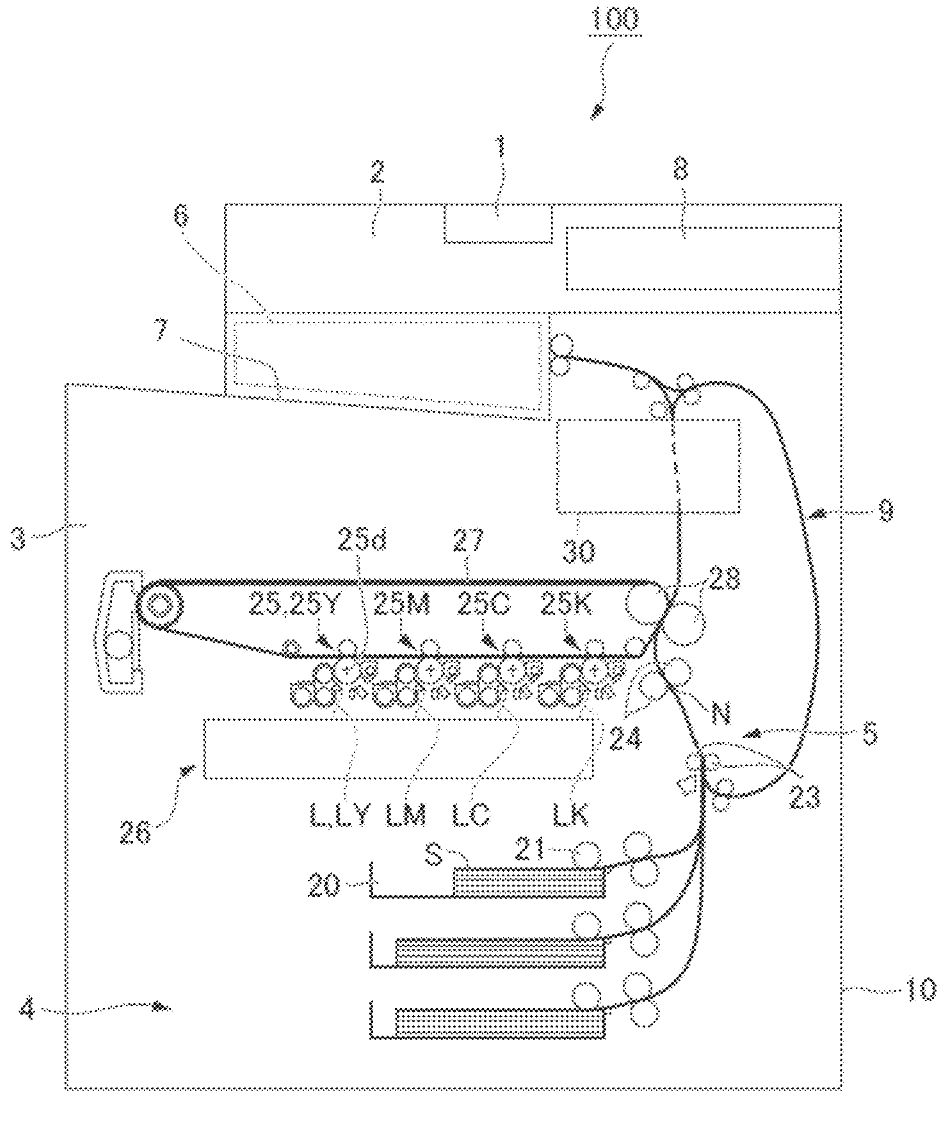
FIG. 1 is a schematic configuration diagram of an image forming apparatus according to a first embodiment.

FIG. 1 is a schematic configuration diagram of an image forming apparatus according to a first embodiment. An image forming apparatus 100 according to the first embodiment is, for example, a multi-function peripheral. The image forming apparatus 100 includes a housing 10, a display 1, a scanner unit 2, an image forming unit 3, a sheet supply unit 4, a conveying unit 5, a sheet discharge tray 7, an inversion unit 9, a control panel 8, and a controller 6. Note that the image forming unit 3 may be a printing device that produces a toner image, or may be an ink jet device. The image forming apparatus 100 forms an image on sheet S by using a developer such as a toner. The sheet S is, for example, paper or a label paper. In general, the sheet S may be any object or material as long as the image forming apparatus 100 can form an image on a surface of the sheet S.

The housing 10 forms the outer shape of the image forming apparatus 100.

The display 1 is an image display device such as a liquid crystal display, an organic EL (Electro Luminescence) display, or the like. The display 1 displays various information about the image forming apparatus 100.

The scanner unit 2 reads image information as brightness and darkness of reflected light from a document or the like. The scanner unit 2 records the image information as read. The scanner unit 2 outputs the generated image information to the image forming unit 3. Note that the recorded image information may instead, or in addition to, be transmitted from another information processing apparatus (e.g., an external device) via a network.

The image forming unit 3 forms an output image (hereinafter referred to as a toner image) with a recording agent such as toner on the basis of the image information received from the scanner unit 2 or the image information received from an external device. The image forming unit 3 transfers the toner image onto the surface of the sheet S. The image forming unit 3 heats and presses the toner image on the surface of the sheet S, and thus fixes the toner image to the sheet S. Note that the sheet S may be a sheet supplied by the sheet supply unit 4, or a sheet manually inserted.

The sheet supply unit 4 supplies the sheets S one by one to the conveying unit 5 in accordance with the timing at which the image forming unit 3 forms the toner image. The sheet supply unit 4 includes a sheet accommodating portion 20 and a pickup roller 21.

The sheet accommodating portion 20 accommodates a sheet S having a predetermined size and type.

The pickup roller 21 picks up the sheets S, one by one, from the sheet accommodating portion 20. The pickup roller 21 supplies the taken-out sheet S to the conveying unit 5.

The conveying unit 5 conveys the sheet S from the sheet supply unit 4 to the image forming unit 3. The conveying unit 5 includes a conveyance roller 23 and a registration roller 24.

The conveyance roller 23 conveys the sheet S from the pickup roller 21 to the registration roller 24. The conveyance roller 23 makes a leading end of the sheet S, with respect to the conveyance direction, abut against a nip N of the registration roller 24.

The registration roller 24 positions the sheet S at the nip N, thereby adjusting a position of the leading end of the sheet S. The registration roller 24 then conveys the sheet S at timing appropriate for transfer of the toner image to the sheet S when the image forming unit 3.

The image forming unit 3 includes a plurality of image forming portions 25, a laser scanning unit 26, an intermediate transfer belt 27, a transfer portion 28, and a fixing unit 30.

Each image forming portion 25 comprises a photosensitive drum 25*d*. The image forming portion 25 forms, on the photosensitive drum 25*d*, a toner image corresponding to the image information from the scanner unit 2 or an external device. The depicted plurality of image forming portions 25Y, 25M, 25C, and 25K form toner images of yellow, magenta, cyan, and black toner, respectively.

A charger, a developing device, and the like are disposed around the photosensitive drum 25*d*. The charger charges a surface of the photosensitive drum 25*d*. The developing device contains a developer. Depending on the color of the image forming portion 25, the developing device contains yellow, magenta, cyan, or black toners. The developing device develops the electrostatic latent image formed on the photosensitive drum 25*d*. As a result, the toner images formed by the toners of the respective colors are formed on a photosensitive drum 25*d*.

The laser scanning unit 26 scans each photosensitive drum 25*d* with a laser beam L, and thus selectively exposes the photosensitive drum 25*d*. The laser scanning unit 26 exposes the photosensitive drum 25*d* of the image forming portions 25Y, 25M, 25C, and 25K for each color different laser beams LY, LM, LC, and LK. Accordingly, the laser scanning unit 26 forms an electrostatic latent image on the photosensitive drum 25*d* of each component color.

The toner image on the surface of the photosensitive drum 25*d* is first transferred (the primary transfer) to the intermediate transfer belt 27.

The transfer portion 28 then transfers (the secondary transfer) the toner image on the intermediate transfer belt 27, onto the surface of the sheet S at a secondary transfer position.

The fixing unit 30 fixes the toner image to the sheet S, by heating and pressing the toner image transferred to the sheet S.

The inversion unit 9 inverts the sheet S to permit operations to form an image on a back surface of the sheet S. The inversion unit 9 reverses the sheet S discharged from the fixing unit 30 by switchback or the like. The inversion unit 9 then conveys the inverted sheet S toward the registration roller 24.

The sheet discharge tray 7 stores the sheet S (on which an image has been formed) that has been discharged after printing.

The control panel 8 includes a plurality of buttons. The control panel 8 receives an input operation or operations performed by a user. The control panel 8 outputs a signal corresponding to the operation performed by the user to the controller 6. Note that the display 1 and the control panel 8 may be configured as an integrated touch panel.

The controller 6 controls respective components of the image forming apparatus 100.

Figure 2:
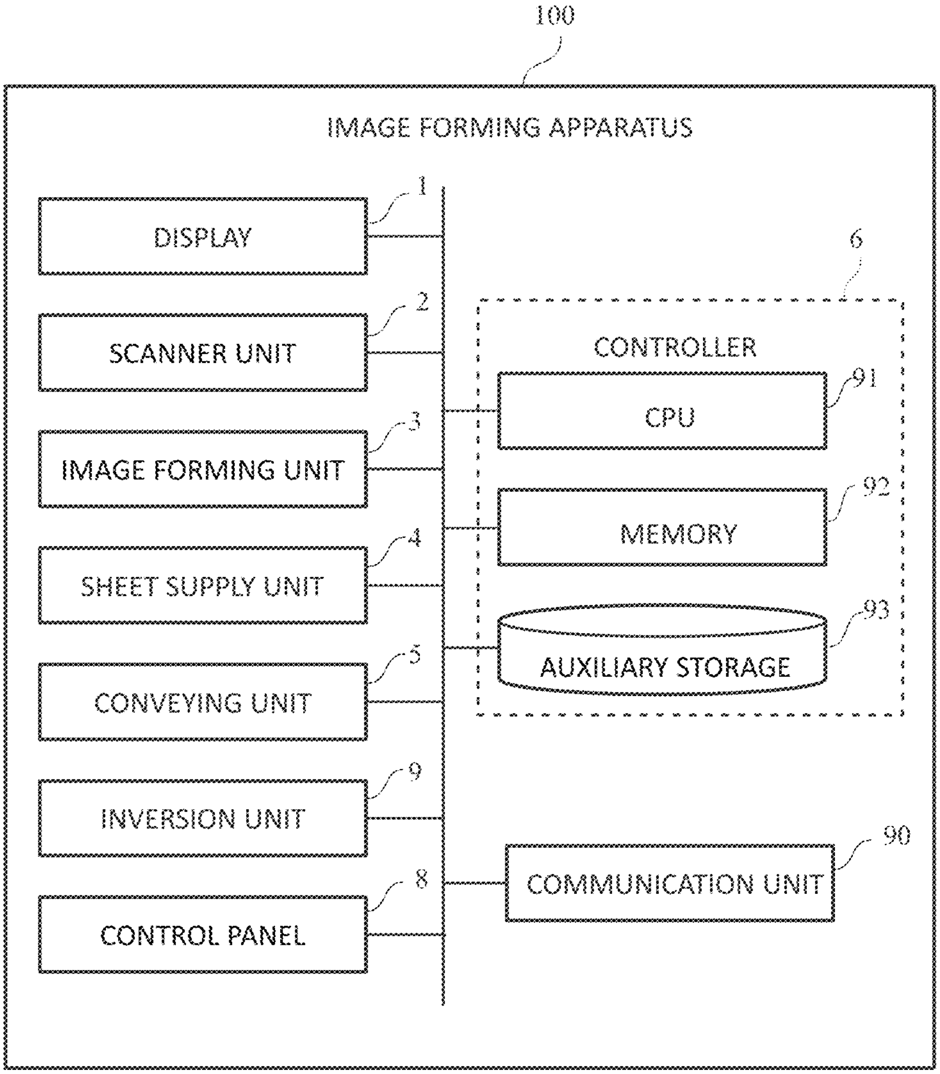
FIG. 2 is a hardware configuration diagram of an image forming apparatus according to a first embodiment.

FIG. 2 is a hardware configuration diagram of the image forming apparatus 100 according to the first embodiment. The image forming apparatus 100 includes a central processing unit (CPU) 91, a memory 92, an auxiliary storage device 93, and the like connected by a bus. The image forming apparatus executes a program (more particularly, CPU 91 executes program instructions stored in memory 92, auxiliary storage device 93, or otherwise provided). The image forming apparatus 100 thus functions as an apparatus having a scanner unit 2, an image forming unit 3, a sheet supply unit 4, a conveying unit 5, an inversion unit 9, a control panel 8, and a communication unit 90 by executing a program.

The CPU 91 functions as the controller 6 by executing a program stored in the memory 92 and the auxiliary storage device 93. The controller 6 controls the operation of each functional unit of the image forming apparatus 100.

The auxiliary storage device 93 is a storage device such as a magnetic hard disk device or a semiconductor storage device. The auxiliary storage device 93 stores various types of information related to the image forming apparatus 100.

The communication unit 90 includes a communication interface for connecting to an external device. The communication unit 90 communicates with the external device via the communication interface.

Figure 3:
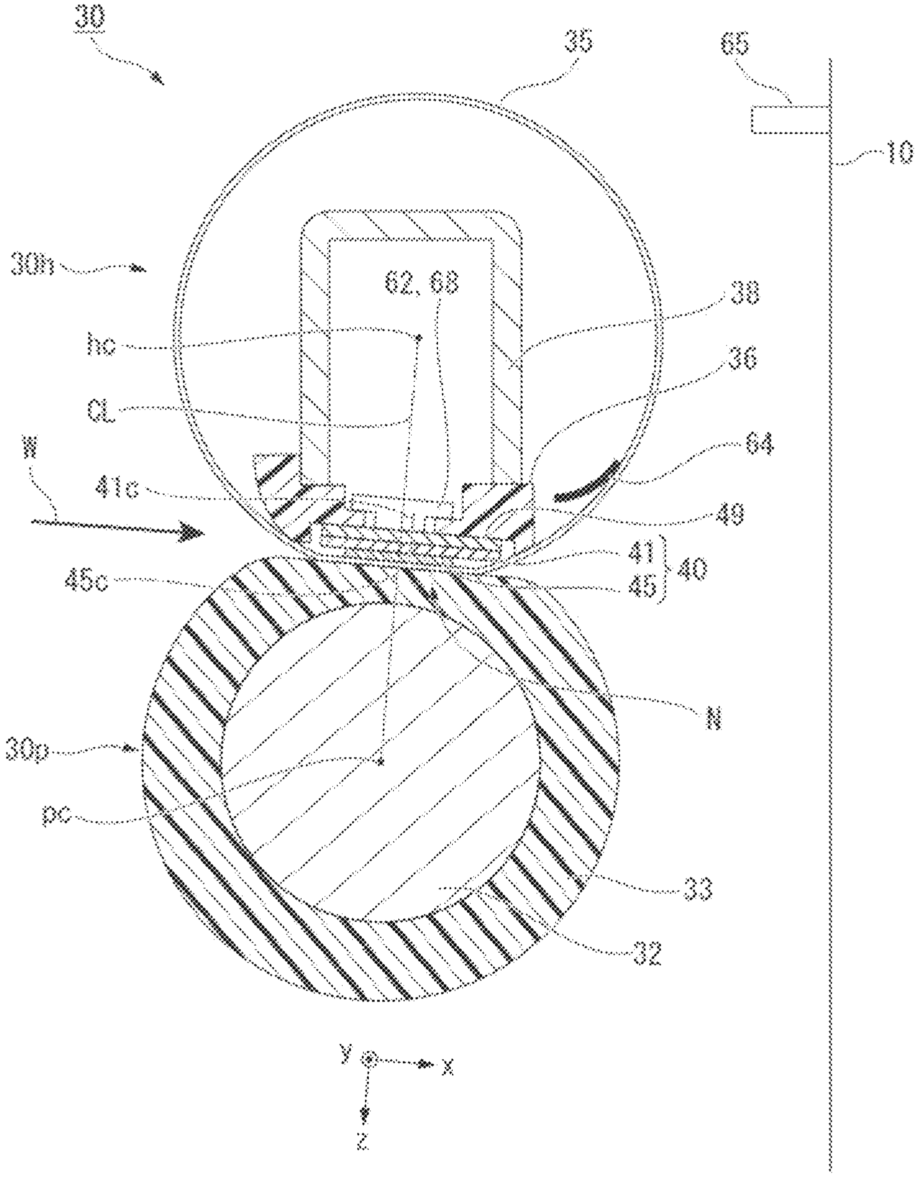
FIG. 3 is a cross-sectional view of a heating device of a first embodiment.

FIG. 3 is a front cross-sectional view of a heating device according to the first embodiment. The heating device according to the first embodiment is a fixing unit 30. The fixing unit 30 includes a pressing roller 30*p* and a film unit 30*h*.

The pressing roller 30*p* forms a nip N with the film unit 30*h*. The pressing roller 30*p* presses the toner image on the sheet S that has entered the nip N. The pressing roller 30*p* rotates to convey the sheet S. The pressing roller 30*p* includes a core metal 32, an elastic layer 33, and a release layer (not separately depicted). As described above, the pressing roller 30*p* can press a front surface of a cylindrical film 35, and can be rotationally driven.

The core metal 32 is formed into a columnar shape by a metal material such as stainless steel. Both ends of the core metal 32 in the axial direction are rotatably supported. The core metal 32 is rotationally driven by a motor or the like. The core metal 32 abuts against a cam member or the like. The cam member rotates so as to move the core metal 32 closer to and away from the film unit 30*h*.

The elastic layer 33 is formed of an elastic material such as silicone rubber. The elastic layer 33 is formed to have a constant thickness on an outer circumferential surface of the core metal 32.

The release layer is formed of a resin material such as PFA (tetrafluoroethylene-perfluoroalkylvinylether copolymer). The release layer is formed on an outer peripheral surface of the elastic layer 33.

Hardness of an outer peripheral surface of the pressing roller 30$p$ is preferably 40 to 70 at a load of 9.8 N in an ASKER-C hardness meter. Thereby, an area of the nip N and durability of the pressing roller 30$p$ are ensured.

The pressing roller 30$p$ can move closer to and away from the film unit 30$h$ by the rotation of the cam member. When the pressing roller 30$p$ is brought close to the film unit 30$h$ and pressed by a pressing spring, the nip N is formed. On the other hand, when the sheet jams in the fixing unit 30, the pressing roller 30$p$ is moved away from the film unit 30$h$, so that it is possible to remove the sheet S. Further, when the cylindrical film 35 stops rotating during sleep, by the cylindrical film 35 being made separating from the film unit 30$h$, the plastic deformation of the cylindrical film 35 can be prevented from being deformed.

The pressing roller 30$p$ is driven to rotate by a motor. When the pressing roller 30$p$ rotates in a state where the nip N is formed, the cylindrical film 35 of the film unit 30$h$ rotates in a driven manner. The pressing roller 30$p$ rotates in a state where the sheet S is disposed at the nip N, thereby conveying the sheet S in the conveyance direction W.

The film unit 30$h$ heats the toner image of the sheet S that has entered the nip N. The film unit 30$h$ includes a cylindrical film 35, a heater unit 40, a heat conductor 49, a support member 36, a stay 38, a heater temperature sensor 62, a thermostat 68, and a film temperature sensor 64.

The cylindrical film 35 is formed in a cylindrical shape. The cylindrical film 35 includes, in order from the inner peripheral side, a base layer, an elastic layer, and a release layer. The base layer is formed of a material such as nickel (Ni) in a tubular shape. The elastic layer is laminated on an outer peripheral surface of the base layer. The elastic layer is formed of an elastic material such as silicone rubber. The release layer is laminated on the outer peripheral surface of the elastic layer. The release layer is formed of a material such as a PFA resin.

Figure 4:
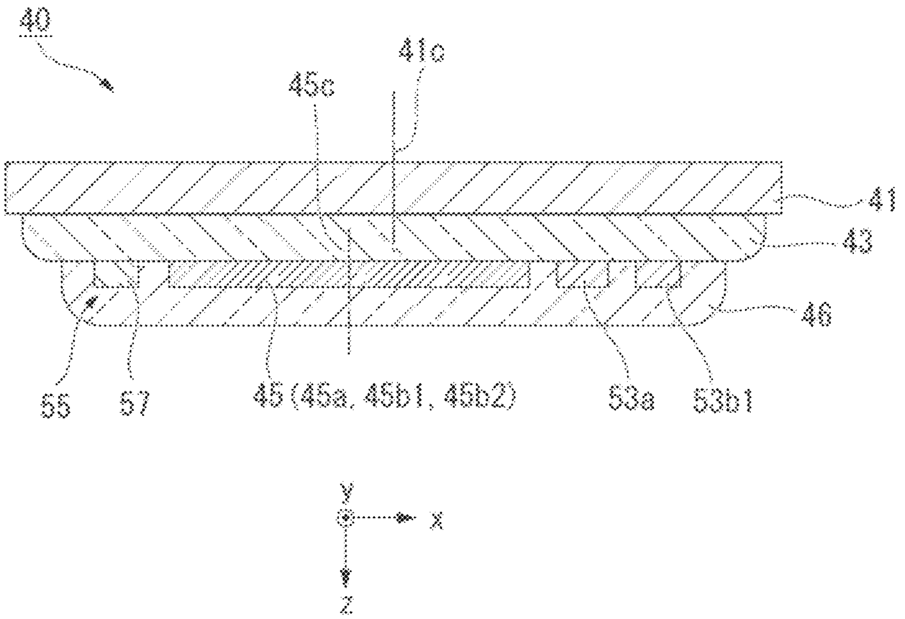
FIG. 4 is a cross-sectional view of a heater unit.
Figure 5:
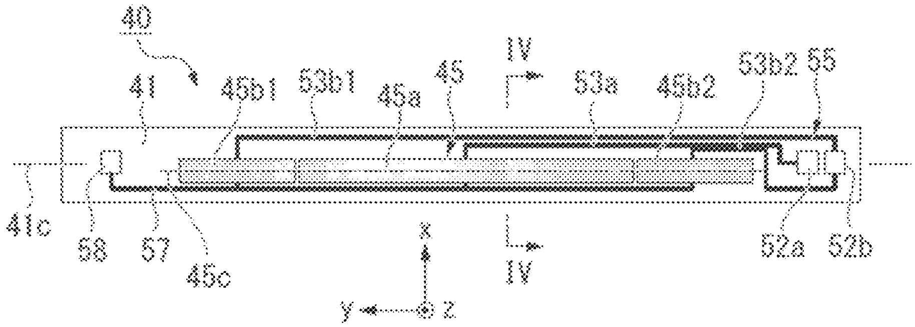
FIG. 5 is a bottom view of a heater unit.

FIG. 4 is a front cross-sectional view of the heater unit taken along line IV-IV in FIG. 5. FIG. 5 is a bottom view (a view from the +z direction) of the heater unit. The heater unit 40 includes a substrate (heating element substrate) 41, a heating element group 45, and a wiring set 55.

The substrate 41 is formed of a metal material such as stainless steel, a ceramic material such as aluminum nitride, or the like. The substrate 41 is formed in a plate shape having an elongated rectangular shape. The substrate 41 is disposed radially inward of the cylindrical film 35. In the substrate 41, an axial direction of the cylindrical film 35 is defined as a longitudinal direction.

In the present application, x direction, y direction, and z direction are defined as follows. The y direction is the longitudinal direction of the substrate 41. The y direction is parallel to the width direction of the cylindrical film 35. As will be described later, the +y direction is a direction from a central heating element 45$a$ toward a first end heating element 45$b$1.

The x direction is the short direction of the substrate 41, and the +x direction is the conveyance direction (the downstream direction) of the sheet S. The z direction is a normal direction of the substrate 41, and the +z direction is a direction in which the heating element group 45 is disposed with respect to the substrate 41. An insulating layer 43 is formed of a glass material or the like on a surface in the +z direction of the substrate 41.

The heating element group 45 is disposed on the substrate 41. 4, the heating element group 45 is formed on a surface in the +z direction of the insulating layer 43. The heating element group 45 is formed of a TCR (temperature coefficient of resistance) material. For example, the heating element group 45 is formed of a silver-palladium alloy or the like. An outer shape of the heating element group 45 is formed in a rectangular shape having the y direction as the longitudinal direction and the x direction as the short direction.

As shown in FIG. 5, the heating element group 45 includes a first end heating element 45$b$1, a central heating element 45$a$, and a second end heating element 45$b$2 arranged side by side in the y direction. The central heating element 45$a$ is disposed in the center of the heating element group 45 in the y direction. The central heating element 45$a$ may be configured by combining a plurality of small heating elements arranged side by side in the y direction. The first end heating element 45$b$1 is arranged at the +y direction of the central heating element 45$a$ and at the end of the heating element group 45 in the y direction. The second end heating element 45$b$2 is disposed at an end in the −y direction of the central heating element 45$a$, i.e., at an end in the −y direction of the heating element group 45. The boundary line between the central heating element 45$a$ and the first end heating element 45$b$1 may be arranged in parallel to the x direction, or may be arranged so as to be angled with respect to the x direction. The same applies to the boundary line between the central heating element 45$a$ and the second end heating element 45$b$2.

The heating element group 45 generates heat when energized. An electric resistance value of the central heating element 45$a$ is smaller than the electric resistance values of the first end heating element 45$b$1 and the second end heating element 45$b$2.

A sheet S having a small width in the y direction may be passed through the center in the y direction of the fixing unit 30 without overlapping the end elements. In such a case, the controller 6 causes only the central heating element 45$a$ to generate heat. On the other hand, in the case of a sheet S having a large width in the y direction, the controller 6 causes the entirety of the heating element group 45 to generate heat. Therefore, heat generation of the central heating element 45$a$ and the first end heating element 45$b$1 and the second end heating element 45$b$2 can be controlled independently of each other. Similarly, heat generation of the first end heating element 45$b$1 and the second end heating element 45$b$2 can be controlled.

The wiring set 55 (also referred to as a wiring group) is formed of a metal material such as silver.

The wiring set 55 includes a central junction 52$a$, a central wiring 53$a$, an end junction 52$b$, a first end wiring 53$b$1, a second end wiring 53$b$2, a common junction 58, and a common wiring 57.

The central junction 52$a$ is arranged in the −y direction of the heating element group 45. The central routing 53$a$ is arranged in the +x direction of the heating element group 45. The central routing 53$a$ connects the end side in the +x direction of the central heating element 45$a$ and the central junction 52$a$.

The end junction 52$b$ is arranged in the −y direction of the central junction 52$a$. The first end holding 53$b$1 is arranged in the +x direction of the heating element group 45 and in the +x direction of the central routing 53$a$.

The first end holding 53$b$1 connects an end side of the first end heating element 45$b$1 in the +x direction and an end of the end junction 52$b$ in the +x direction. The second end holding 53$b$2 is arranged in the +x direction of the heating element group 45 and in the −x direction of the central routing 53$a$. The second end holding 53$b$2 connects the end side in the +x direction of the second end heating element 45$b$2 and the end in the −x direction of the end junction 52$b$.

The common junction 58 is arranged in the +y direction of the heating element group 45. The common wiring 57 is arranged in the −x direction of the heating element group 45. The common wiring 57 connects the end sides in the −x direction of the central heating element 45$a$, the first end heating element 45$b$1, and the second end heating element 45$b$2 to the common junction 58.

In this way, in the +x direction of the heating element group 45, the second end holding 53$b$2, the central routing 53$a$, and the first end holding 53$b$1 are arranged. On the other hand, only the common wiring 57 is disposed in the −x direction of the heating element group 45. Therefore, the center 45$c$ of the heating element group 45 in the x direction is offset in the −x direction from the center 41$c$ in the x direction of the substrate 41.

As shown in FIG. 3, a straight line CL connecting the center pc of the pressing roller 30$p$ and the center hc of the film unit 30$h$ is defined. The center 41$c$ in the x direction of the substrate 41 is arranged in the +x direction from the straight line CL. Accordingly, the substrate 41 extends in the +x direction of the nip N, and the sheet S that has passed through the nip N is easily peeled off from the film unit 30$h$.

The center 45$c$ of the heating element set 45 in the x direction is disposed on the straight line CL. The heating element group 45 is entirely contained in the region of the nip N, and is disposed in the center of the nip N. Accordingly, heat distribution of the nip N becomes uniform, and the sheet S passing through the nip N is uniformly heated.

As shown in FIG. 4, the heating element group 45 and the wiring group 55 are formed on the +z direction surface of the insulating layer 43. The protective layer 46 is formed of a glass material or the like so as to cover the heating element group 45 and the wiring set 55. The protective layer 46 improves sliding (reduces friction) between the heater unit 40 and the cylindrical film 35.

As shown in FIG. 3, the heater unit 40 is disposed inside the cylindrical film 35. A lubricant is applied to an inner peripheral surface of the cylindrical film 35. The heater unit 40 contacts the inner circumferential surface of the cylindrical film 35 via a lubricant. When the heater unit 40 generates heat, the viscosity of the lubricant decreases. Accordingly, sliding friction between the heater unit 40 and the cylindrical film 35 is low.

As described above, the cylindrical film 35 is a belt-shaped thin film that slides along a surface of the heater unit 40 while being in contact with the heater unit 40 on one side.

The heat conductor 49 is formed of a metal material having a high thermal conductivity such as copper. An outer shape of the heat conductor 49 is equal to an outer shape of the substrate 41 of the heater unit 40. The heat conductor 49 is disposed in contact with the surface of the heater unit 40 in the −z direction.

The support member 36 is formed of a resin material such as a liquid crystal polymer. The support member 36 is disposed so as to cover the −z direction and both sides in the x direction of the heater unit 40. The support member 36 supports the heater unit 40 via the heat conductor 49. Rounded chamfers are formed at both ends of the support member 36 in the x direction. The support member 36 supports the inner peripheral surface of the cylindrical film 35 at both ends in the x direction of the heater unit 40.

When the sheet S passing through the fixing unit 30 is heated, a temperature distribution is generated in the heater unit 40 in accordance with the size of the sheet S. When the heater unit 40 locally reaches a high temperature, the temperature may exceed heat resistant temperature of the support member 36 formed of a resin material. The heat conductor 49 averages the temperature distribution of the heater unit 40. Thereby, the heat resistance of the support member 36 is ensured.

Figure 6:
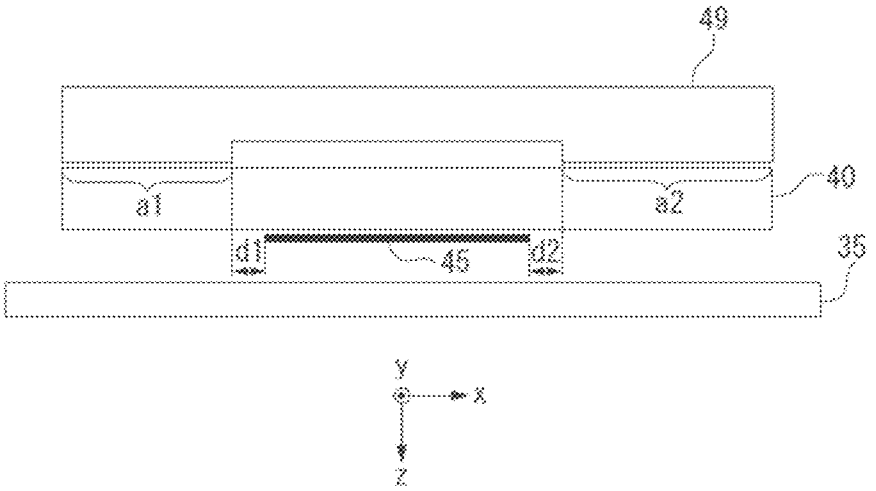
FIG. 6 is a cross-sectional view of a heat conductor, a heater unit, and a cylindrical belt.

FIG. 6 is a front cross-sectional view of a heat conductor, a heater unit, and a cylindrical belt. The heat conductor 49 is disposed on a surface of the heater unit 40 that does not come into contact with the cylindrical film 35. Further, the heat conductor 49 is configured so as not to come into contact with the heater unit 40 at a position where heat generation distribution in the heater unit 40 becomes a peak. More specifically, as shown in FIG. 6, the heater unit 40 and the heat conductor 49 are in contact with each other in regions a1 and a2. Then, a non-contact portion forms a groove portion of the heat conductor 49. a width of the groove portion is set to be wider than a width of the heating element group 45 of the heater unit 40 by length d1 and length d2, respectively. For example, the heating element group 45 of the heater unit 40 has a width of 4.5 to 4.9 mm, and the groove portion has a width of about 5 mm.

The stay 38 shown in FIG. 3 is formed of a steel plate material or the like. A cross section perpendicular to the y direction of the stay 38 is formed in a U-shape. The stay 38 is mounted in the −z direction of the support member 36 so as to close an opening portion of the U shape with the support member 36. The stay 38 extends in the y direction. Both ends of the stay 38 in the y direction are fixed to the housing of the image forming apparatus 100. Thereby, the film unit 30$h$ is supported by the image forming apparatus 100. The stay 38 improves rigidity of the film unit 30$h$. Flanges that restrict movement of the cylindrical film 35 in the y direction can be attached near both ends of the stay 38 in the y direction.

The heater temperature sensor 62 is disposed in the −z direction of the heater unit 40 with the heat conductor 49 interposed therebetween. For example, the heater temperature sensor 62 is a thermistor. The heater temperature sensor 62 is mounted on and supported by a surface of the support member 36 in the −z direction. A temperature sensitive element of the heater temperature sensor 62 contacts the heat conductor 49 through a hole that passes through the support member 36 in the z direction. The heater temperature sensor 62 measures the temperature of the heater unit 40 through the heat conductor 49.

The thermostat 68 is disposed in the same manner as the heater temperature sensor 62. The thermostat 68 is incorporated in an electric circuit, which will be described later. When the temperature of the heater unit 40 detected through the heat conductor 49 exceeds a predetermined temperature, the thermostat 68 cuts off the energization of the heating element group 45.

Figure 7:
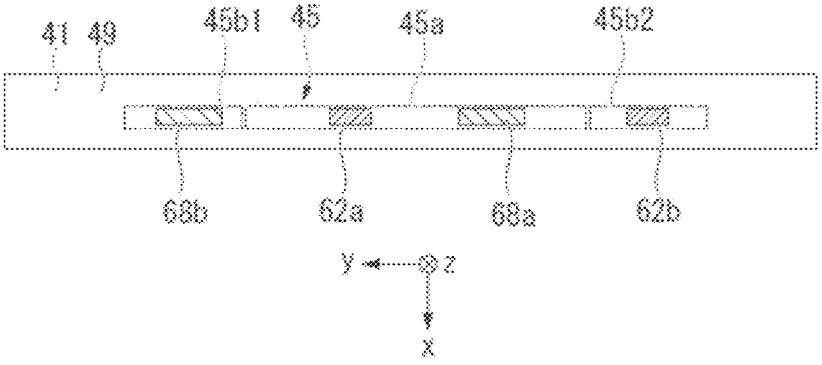
FIG. 7 is a plan view of a heater temperature sensor and a thermostat.

FIG. 7 is a plan view (a view from the −z direction) of a heater temperature sensor and a thermostat. In FIG. 7, description of the support member 36 is omitted. Note that the following description of arrangement of the heater temperature sensor, the thermostat, and the film temperature sensor describes arrangement of the respective temperature sensitive elements.

A plurality of heater temperature sensors 62 (central heater temperature sensor 62$a$ and end heater temperature sensor 62$b$) are arranged side by side in the y direction. The plurality of heater temperature sensors 62 are disposed near the heating element group 45 in the y direction. The plurality of heater temperature sensors 62 are disposed in the center of the heating element group 45 in the x direction. That is, when viewed in the z direction, the plurality of heater temperature sensors 62 and the heating element group 45 overlap at least partially.

The plurality of thermostats 68 (central thermostat 68*a* and end thermostat 68*b*) are also arranged in the same manner as the plurality of heater temperature sensors 62 described above.

The plurality of heater temperature sensors 62 include the central heater temperature sensor 62*a* and the end heater temperature sensor 62*b*.

The central heater temperature sensor 62*a* measures temperature of the central heating element 45*a*. The central heater temperature sensor 62*a* is disposed within the range of the central heating element 45*a*. That is, when viewed from the z direction, the central heater temperature sensor 62*a* and the central heating element 45*a* overlap each other.

The end heater temperature sensor 62*b* measures the temperature of the second end heating element 45*b*2. As described above, the heat generation of the first end heating element 45*b*1 and the second end heating element 45*b*2 is similarly controlled. Therefore, the temperature of the first end heating element 45*b*1 and the temperature of the second end heating element 45*b*2 are equal to each other. The end heater temperature sensor 62*b* is disposed in the range of the second end heating element 45*b*2. That is, when viewed in the z direction, the end heater temperature sensor 62*b* and the second end heating element 45*b*2 overlap each other.

The plurality of thermostats 68 comprise the central thermostat 68*a* and the end thermostat 68*b*.

The central thermostat 68*a* interrupts the energization of the heating element group 45 when the temperature of the central heating element 45*a* exceeds the predetermined temperature. The central thermostat 68*a* is located within the range of the central heating element 45*a*. That is, when viewed from the z direction, the central thermostat 68*a* and the central heating element 45*a* overlap each other.

When the temperature of the first end heating element 45*b*1 exceeds the predetermined temperature, the end thermostat 68*b* cuts off the energization of the heating element group 45. As described above, the heat generation of the first end heating element 45*b*1 and the second end heating element 45*b*2 is similarly controlled. Therefore, the temperature of the first end heating element 45*b*1 and the temperature of the second end heating element 45*b*2 are equal to each other. The end thermostat 68*b* is located within the range of the first end heating element 45*b*1. That is, when viewed from the z direction, the end thermostat 68*b* and the first end heating element 45*b*1 overlap each other.

As described above, the central heater temperature sensor 62*a* and the central thermostat 68*a* are disposed within the range of the central heating element 45*a*. As a result, the temperature of the central heating element 45*a* is measured. In addition, when the temperature of the central heating element 45*a* exceeds the predetermined temperature, the energization of the heating element group 45 is cut off. On the other hand, an end heater temperature sensor 62*b* and an end thermostat 68*b* are disposed within the range of the first end heating element 45*b*1 and the second end heating element 45*b*2. Accordingly, the temperatures of the first end heating element 45*b*1 and the second end heating element 45*b*2 are measured. Further, when the temperature of the first end heating element 45*b*1 and the second end heating element 45*b*2 exceeds the predetermined temperature, the energization of the heating element group 45 is cut off.

The plurality of heater temperature sensors 62 and the plurality of thermostats 68 are arranged alternately along the y direction. As described above, the first end heating element 45*b*1 is disposed in the +y direction of the central heating element 45*a*. The end thermostat 68*b* is disposed within the range of the first end heating element 45*b*1. The central heater temperature sensor 62*a* is disposed in the +y direction from the center of the central heating element 45*a* in the y direction. The central thermostat 68*a* is disposed in the −y direction from the center of the central heating element 45*a* in the y direction. As described above, the second end heating element 45*b*2 is disposed in the −y direction of the central heating element 45*a*. An end heater temperature sensor 62*b* is disposed within the range of the second end heating element 45*b*2. Accordingly, from the +y direction, the end thermostat 68*b*, the central heater temperature sensor 62*a*, the central thermostat 68*a*, and the end heater temperature sensor 62*b* are arranged in this order from the +y direction to the −y direction.

Generally, the thermostat 68 connects and disconnects an electrical circuit by utilizing bending deformation of a bimetal with temperature change. The thermostat is formed to be elongated to match the shape of the bimetal. Further, terminals extend outward from both ends in the longitudinal direction of the thermostat 68. The connector of the external sling is connected to the terminal by caulking. Therefore, it is necessary to secure a space on an outer side in the longitudinal direction of the thermostat 68. Since there is no spatial margin in the fixing unit 30 in the x-direction, the longitudinal direction of the thermostat 68 is arranged along the y-direction.

With this arrangement, when the plurality of thermostats 68 are arranged side by side in the y direction, it becomes difficult to secure a connection space for an external routing.

As described above, the plurality of heater temperature sensors 62 and the plurality of thermostats 68 are alternately arranged along the y direction. Thereby, the heater temperature sensor 62 is disposed adjacent to the thermostat 68 in the y direction. Therefore, it is possible to secure a connection space for the external routing to the thermostat 68. Further, a degree of freedom in a layout of the thermostat 68 and the heater temperature sensor 62 in the y direction is increased. Accordingly, the thermostat 68 and the heater temperature sensor 62 may be disposed at an optimal position, and the temperature of the fixing unit 30 may be controlled. Further, an isolation of an AC wiring connected to the plurality of thermostats 68 and an DC wiring connected to the plurality of heater temperature sensors 62 is facilitated. Accordingly, generation of noise in the electric circuit is suppressed.

The film temperature sensor 64 is disposed inside the cylindrical film 35 and in the +x direction of the heater unit 40, as shown in FIG. 3. The film temperature sensor 64 contacts the inner circumferential surface of the cylindrical film 35, and measures temperature of the cylindrical film 35.

Note that the image forming apparatus 100 may further include an environment temperature sensor 65 in addition to the heater temperature sensor 62 and the film temperature sensor 64. The environment temperature sensor 65 measures temperature around its mounted position. The environment temperature sensor 65 may be attached to any position near the fixing unit 30. The vicinity of the fixing unit 30 is a position at which the environment temperature sensor 65 can measure temperature of the space in which the fixing unit 30 is located (ambient temperature). For example, as shown in FIG. 3, the environment temperature sensor 65 may be attached to the housing 10 located outside of the film unit 30*h*.

If the image forming apparatus 100 comprises the environment temperature sensor 65, the controller 6 may control the energization of the heating element group 45 based on the temperatures measured by the heater temperature sensor 62, the film temperature sensor 64, and the environment temperature sensor 65. For example, when the temperature measured by the environment temperature sensor 65 is higher than a predetermined value or when the temperature is lower than the predetermined value, the controller 6 may stop the energization of the heating element group 45.

Figure 8:
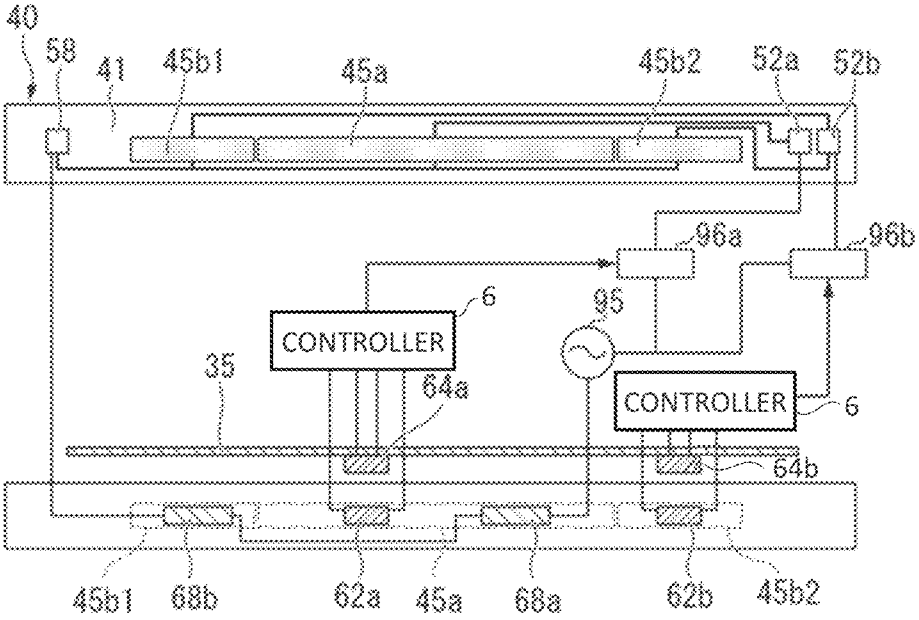
FIG. 8 is an circuit diagram of a heating device according to a first embodiment.

FIG. 8 is an electric circuit diagram of the heating device according to the first embodiment. In FIG. 8, a bottom view of FIG. 5 is arranged above, and a plan view of FIG. 8 is arranged below, respectively. FIG. 8 also illustrates the plurality of film temperature sensor meters 64, along with a cross section of the cylindrical film 35, above the plan view below.

The plurality of film temperature sensors 64 comprise a central film temperature sensor 64*a* and an end film temperature sensor 64*b*.

The central film temperature sensor 64*a* contacts the center of the cylindrical film 35 in the y direction. The central film temperature sensor 64*a* contacts the cylindrical film 35 within the range of the central heating element 45*a* in the y direction. The central film temperature sensor 64*a* measures the temperature of the center in the y direction of the cylindrical film 35.

The end film temperature sensor 64*b* contacts the end of the cylindrical film 35 in the −y direction. The end film temperature sensor 64*b* contacts the cylindrical film 35 within the range of the second end heating element 45*b*2 in the y direction. The end film temperature sensor 64*b* measures temperature of the end in the −y direction of the cylindrical film 35. As described above, the heat generation of the first end heating element 45*b*1 and the second end heating element 45*b*2 is similarly controlled. Therefore, the temperature at the end in the −y direction of the cylindrical film 35 and the temperature at the end in the +y direction are equal to each other.

A power source 95 is connected to the central junction 52*a* via a central triac 96*a*. The power source 95 is connected to the end junction 52*b* via an end triac 96*b*. The controller 6 controls ON/OFF of the central triac 96*a* and the end triac 96*b* independently of each other.

When the controller 6 turns on the central triac 96*a*, electric power is supplied from the power source 95 to the central heating element 45*a*. As a result, the central heating element 45*a* generates heat. When the controller 6 turns on the end triac 96*b*, electric power is supplied from the power source 95 to the first end heating element 45*b*1 and the second end heating element 45*b*2. Accordingly, the first end heating element 45*b*1 and the second end heating element 45*b*2 generate heat.

As described above, the central heating element 45*a* and the first end heating element 45*b*1 and the second end heating element 45*b*2 are controlled independently of each other. The central heating element 45*a*, the first end heating element 45*b*1, and the second end heating element 45*b*2 are connected in parallel with respect to the power source 95.

The power source 95 is connected to the common junction 58 via the central thermostat 68*a* and the end thermostat 68*b*. The central thermostat 68*a* and the end thermostat 68*b* are connected in series.

When the temperature of the central heating element 45*a* abnormally rises, detection temperature of the central thermostat 68*a* exceeds the predetermined temperature. At this time, the central thermostat 68*a* cuts off the power supply from the power source 95 to the entirety of the heating element group 45.

When the temperature of the first end heating element 45*b*1 abnormally increases, detection temperature of the end thermostat 68*b* exceeds the predetermined temperature. At this time, the end thermostat 68*b* cuts off the power supply from the power source 95 to the entirety of the heating element group 45. As described above, the heat generation of the first end heating element 45*b*1 and the second end heating element 45*b*2 is similarly controlled. Therefore, when the temperature of the second end heating element 45*b*2 rises abnormally, the temperature of the first end heating element 45*b*1 increases as well. Therefore, similarly, when the temperature of the second end heating element 45*b*2 abnormally rises, the end thermostat 68*b* cuts off the power supply from the power source 95 to the entire heating element group 45.

The controller 6 measures the temperature of the central heating element 45*a* by the central heater temperature sensor 62*a*. The controller 6 measures the temperature of the second end heating element 45*b*2 by the end heater temperature sensor 62*b*. The temperature of the second end heating element 45*b*2 is equal to the temperature of the first end heating element 45*b*1. The controller 6 measures the temperature of the heating element group 45 by the heater temperature sensor 62 at the time of starting of the fixing unit 30 (warming-up time) and return from a pause state (sleep state).

When the temperature of at least one of the central heating element 45*a* and the second end heating element 45*b*2 is lower than the predetermined temperature during the start of the fixing unit 30 and the return from the pause state, the controller 6 causes the heating element group 45 to generate heat for a short time. Thereafter, the controller 6 starts the rotation of the pressing roller 30*p*. The heating of the heating element group 45 causes viscosity of the lubricant applied to the inner surface of the cylindrical film 35 to decrease. This improves slidability (reduces sliding friction) between the heater unit 40 and the cylindrical film 35 at the start of the rotation of the pressing roller 30*p*.

The controller 6 measures the temperature of the central portion of the cylindrical film 35 with the central film temperature sensor 64*a*. The controller 6 measures the temperature of the end (in the −y direction) of the cylindrical film 35 with the end film temperature sensor 64*b*. The temperature at the end in the y direction of cylindrical film 35 is equal to the temperature at end in the +y direction of cylindrical film 35. The controller 6 measures the temperature of the central and end of the cylindrical film 35 in the y direction during the operation of the fixing unit 30.

The controller 6 performs phase control or wave number control of the power supplied to the heating element group 45 with the central triac 96*a* and the end triac 96*b*. The controller 6 controls energization of the central heating element 45*a* based on the temperature measurement result of the central portion in the y direction of the cylindrical film 35. The controller 6 controls energization of the first end heating element 45*b*1 and the second end heating element 45*b*2 based on the temperature measurement result of the end in the y direction of the cylindrical film 35.

In the present embodiment, the heating element group 45 (the central heating element 45*a*, the first end heating element 45*b*1, and the second end heating element 45*b*2) uses a TCR material that has a higher resistance value as the temperature increases. In this case, due to the characteristics of the TCR material, the power in the heating element group 45 decreases with the temperature rise. More specifically, as the heating element group 45 generates heat, a change in power output as shown in the following equation (1) occurs:

$$P=P0/\{1+(\alpha TCR/10^{6})\times(T-T0)\} \qquad (1)$$

Figure 9:
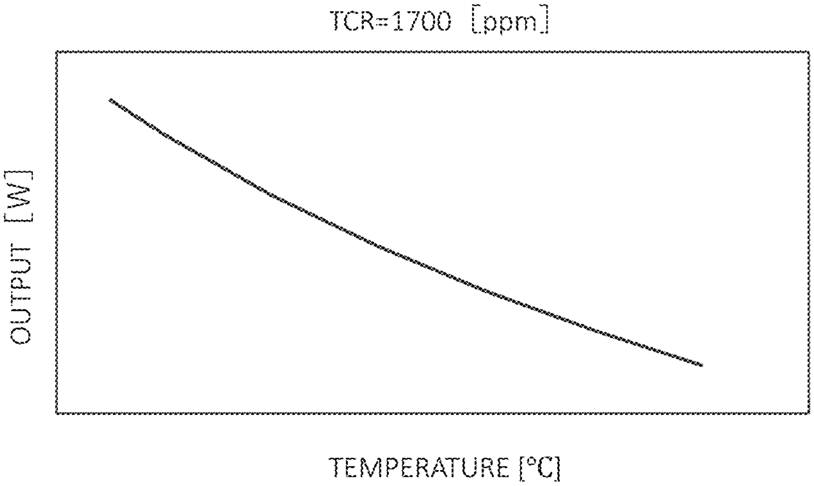
FIG. 9 is a diagram illustrating a relationship between temperature and power use with a TCR material.

Here, P represents an output [unit: Watts (W)] at an arbitrary temperature, P0 represents an output [unit: W] at a reference temperature, and T represents the arbitrary temperature [unit: ° C.], T0 represents the reference temperature [unit: ° C.], and TCR represents a resistance temperature coefficient [unit: ppm]. In the heating element group 45 of the present embodiment, for example, a TCR material having a resistance temperature coefficient of 1700 ppm is used. When using the heating element group 45 in which the TCR material is used, as shown in FIG. 9, the power becomes lower as the temperature increases.

In general, during starting of the fixing unit 30 and returning from the sleep state (hereinafter, collectively referred to as "start-up time"), heating of the heating element group 45 is performed until the cylindrical film reaches a predetermined temperature. That is, at the time of start-up, the heating element group 45 is continuously energized. This causes the heating element group 45 to be heated continuously. Therefore, the heating element group 45 continuously increases in temperature at the time of start-up, and thus the above-described reduction in power becomes significant.

When a start-up processing start condition is satisfied, the controller 6 according to the present embodiment energizes the heating element group 45 by a start-up time energization method. The energization of the heating element group 45 means, in this context, that the central heating element 45*a*, the first end heating element 45*b*1, and the second end heating element 45*b*2 are energized, respectively.

The start-up processing start condition refers to the start-up of the fixing unit 30 from an idle or unheated state to a target operation temperature. Note that at least one of a heater temperature range condition, a film temperature sensor range condition, or an ambient temperature range condition may be further added to the start-up processing start condition. The heater temperature range condition is that at least one of the temperatures measured by the heater temperature sensors 62 is within a predetermined range. The film temperature sensor range condition is that at least one of the temperatures measured by the film temperature sensors 64 is within a predetermined range. The environmental temperature range condition is that the temperature measured by the environment temperature sensor 65 is within a predetermined range.

The varying energization method used during the start-up processing may be any energization method as long as the energization method satisfies the following: the heating element group 45 (the central heating element 45*a*, the first end heating element 45*b*1, and the second end heating element 45*b*2) is energized at a duty ratio of X % at the start of energization, and then is energized at a duty ratio that has been increased by x % at intervals of to seconds.

Figure 10:
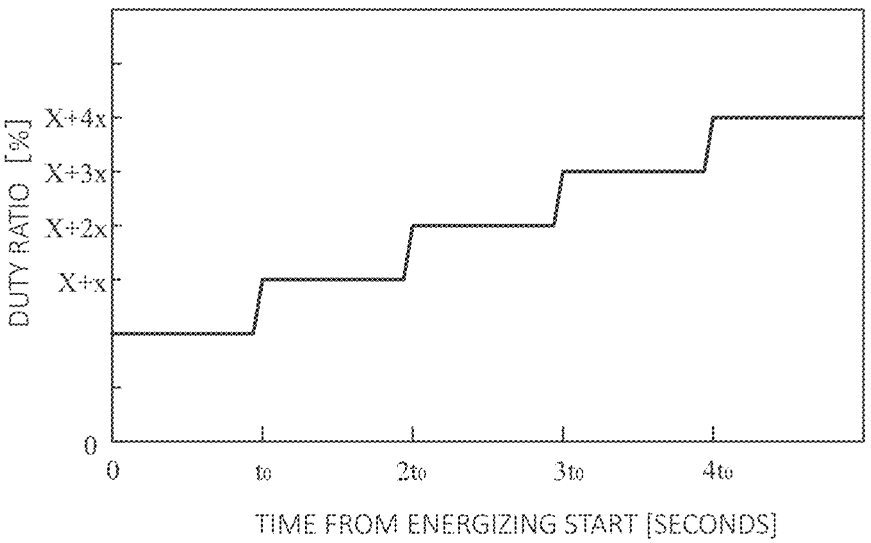
FIG. 10 is a diagram illustrating a change in the duty ratio according to an energization method during start-up processing.

FIG. 10 is a diagram illustrating a change in the duty ratio according to the energization system during the start-up process. As shown in FIG. 10, at the start of energization (t=0), the heating element group 45 starts to be energized at a duty ratio of X %. After that, the duty ratio is changed to (X+x) % when to seconds have elapsed. After that, when $2t_0$ seconds, $3t_0$ seconds, and $4t_0$ seconds respectively elapse, the duty ratio is changed to (X+2x) %, (X+3x) %, and (X+4x) %, respectively. Note that, when the duty ratio has reached 100%, the duty ratio is not further changed.

When the start-up processing start condition is satisfied, the controller 6 controls the central triac 96*a* and the end triac 96*b* so that the heating element group 45 is energized by the start-up time energization method. Note that the controller 6 includes a timing unit capable of measuring times for changing the duty ratio by measuring the elapsed time increments of to seconds (for example, issuing a signal).

In addition, when a start-up processing termination condition is satisfied, the controller 6 stops the energization of the heating element group 45. The start-up processing termination condition means that at least one of the temperatures measured by heater temperature sensors 62 reaches a predetermined temperature (target temperature). The start-up processing termination condition may be that one (or all) of the temperatures measured by the film temperature sensors 64 reach a predetermined temperature.

Note that a temperature range deviation condition may be further added to the start-up processing termination condition. The temperature range deviation condition means that at least one of the heater temperature range condition, the film temperature sensor range condition, or the environment temperature range condition is not satisfied.

Figure 11:
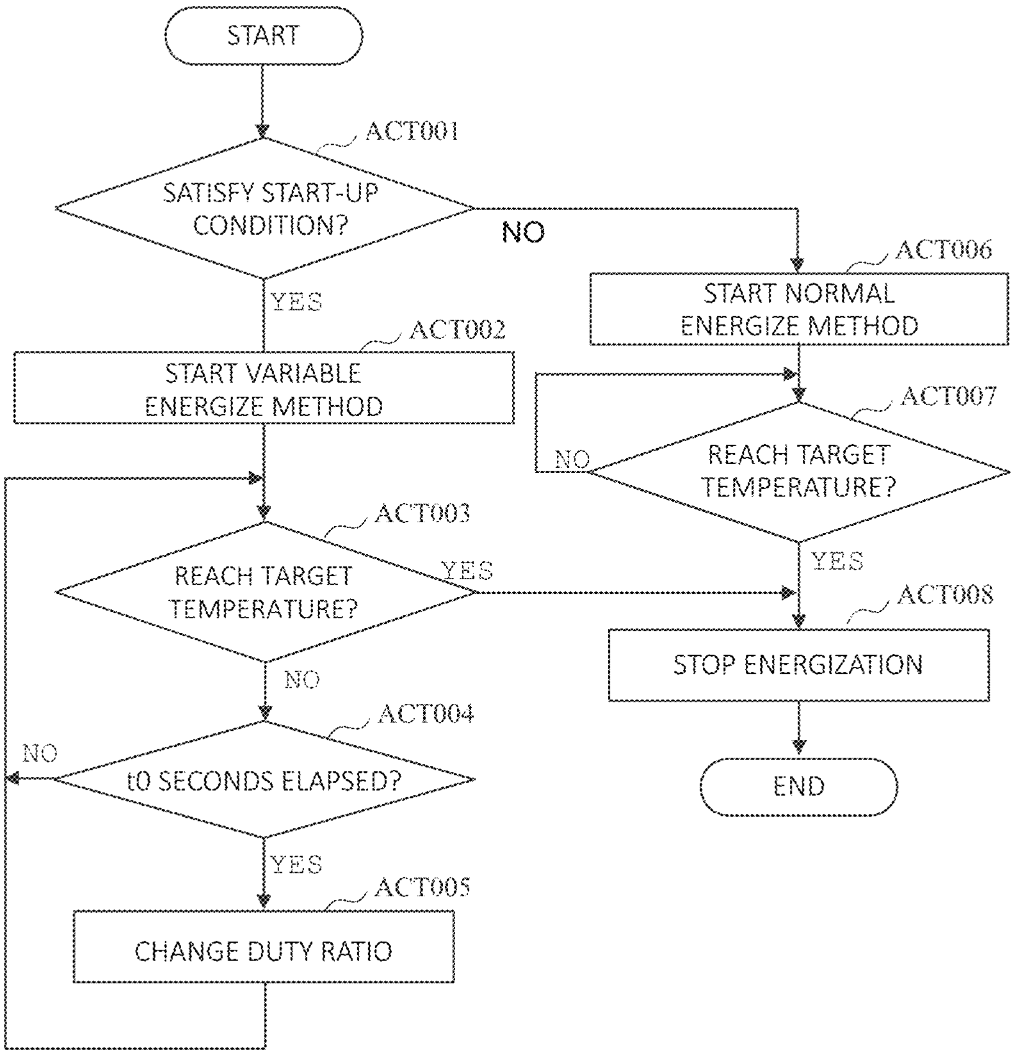
FIG. 11 is a flowchart illustrating a processing at the time of start up by a controller.

FIG. 11 is a flowchart illustrating an example of a process at the time of start-up by the controller 6 according to the first embodiment.

The controller 6 determines whether or not the start-up processing start condition is satisfied (ACT 001). As described above, the start-up processing start condition refers to the start-up time of the fixing unit 30 (for example, the start-up time, the return time from the sleep state, or the like). Note that, the controller 6 may determine that the start-up processing start condition is not satisfied if at least one of the temperatures measured by a heater temperature sensor 62, the film temperature sensor 64, or an environment temperature sensor 65 is not within a predetermined range.

When it is determined that the start-up processing start condition is satisfied (Yes in ACT 001), the controller 6 starts to energize the heating element group 45 by the start-up time energization method (ACT 002). As described above, the energization method during start-up processing is an energization method in which the heating element group 45 is energized at the duty ratio of X % at the start of energization, and is energized at the duty ratio that has been changed by x % at every time increment to.

The controller 6 acquires the temperature measured by the film temperature sensor 64. The controller 6 checks whether the acquired temperature has reached a predetermined target temperature. When the controller determines that the acquired temperature has reached the target temperature (Yes in ACT 003), the controller stops the energization of the heating element group 45 (ACT 008).

On the other hand, when the controller 6 determines that the acquired temperature has not reached the target temperature (No in ACT 003), the controller 6 waits for a notification (signal) to be output from a timing unit or the like. Note that the timing unit notifies (transmits a signal) every time an increment of to seconds has elapsed since the start of the energization to the heating element group 45 in ACT 002. As a result, the controller 6 can recognize the times at which time increment to elapses from the start of the energization.

When it is determined that time increment to has elapsed since the reception of the signal (Yes in ACT 004), the controller 6 changes the duty ratio of the power in the current supply to the heating element group 45 to a value that is higher by x % (ACT 005). Note that, when the duty ratio has already reached 100%, the controller 6 does not further change the duty ratio.

Thereafter, the controller 6 acquires the temperature measured by the film temperature sensor 64 again. The controller 6 determines whether the acquired temperature has reached a predetermined target temperature (that is, whether or not the temperature is equal to or higher than the target temperature) (ACT 003).

On the other hand, when it is determined that the start-up processing start condition is not satisfied (ACT 001, No), the controller 6 starts to energize the heating element group 45 with a normal energization method (ACT 006). The normal energization method is an energization method in which the heating element group 45 is energized with a constant duty ratio (that is, without changing the duty ratio until the set temperature is reached). Note that the controller 6 may prevent the heating element group 45 from being energized if at least one of the temperatures measured by the heater temperature sensor 62, the film temperature sensor 64, or the environment temperature sensor 65 is not within a predetermined range.

The controller 6 acquires the temperature measured by the film temperature sensor 64. The controller 6 checks whether the acquired temperature has reached a predetermined target temperature (that is, whether or not the temperature is equal to or higher than the target temperature). When the controller determines that the acquired temperature has reached the target temperature (Yes in ACT 007), the controller stops the energization of the heating element group 45 (ACT 008).

As described above, the processing at the time of start-up by the controller 6 shown in the flowchart in FIG. 11 ends.

Hereinafter, an example of the first embodiment described above will be described. Experiments were carried out under the following conditions:

- The image forming apparatus 100 having the above-described configuration was used.
- When starting, the energization of the heating element group 45 was performed by the varying energization method during the start-up processing and the normal energization method, respectively.
- In the varying energization system during the start-up process, the duty ratio was changed so that the duty ratio of the power at the start of the energization was 80%, and the duty ratio was increased by 5% every 1.5 seconds after that. (that is, X=0.8, x=0.05, $t_0$=1.5 seconds).
- In the normal energization method, the duty ratio of the power is always set to 100%.
- In both of the varying start-up processing and the normal energization method, a power of 1485 W was applied.

Figure 12:
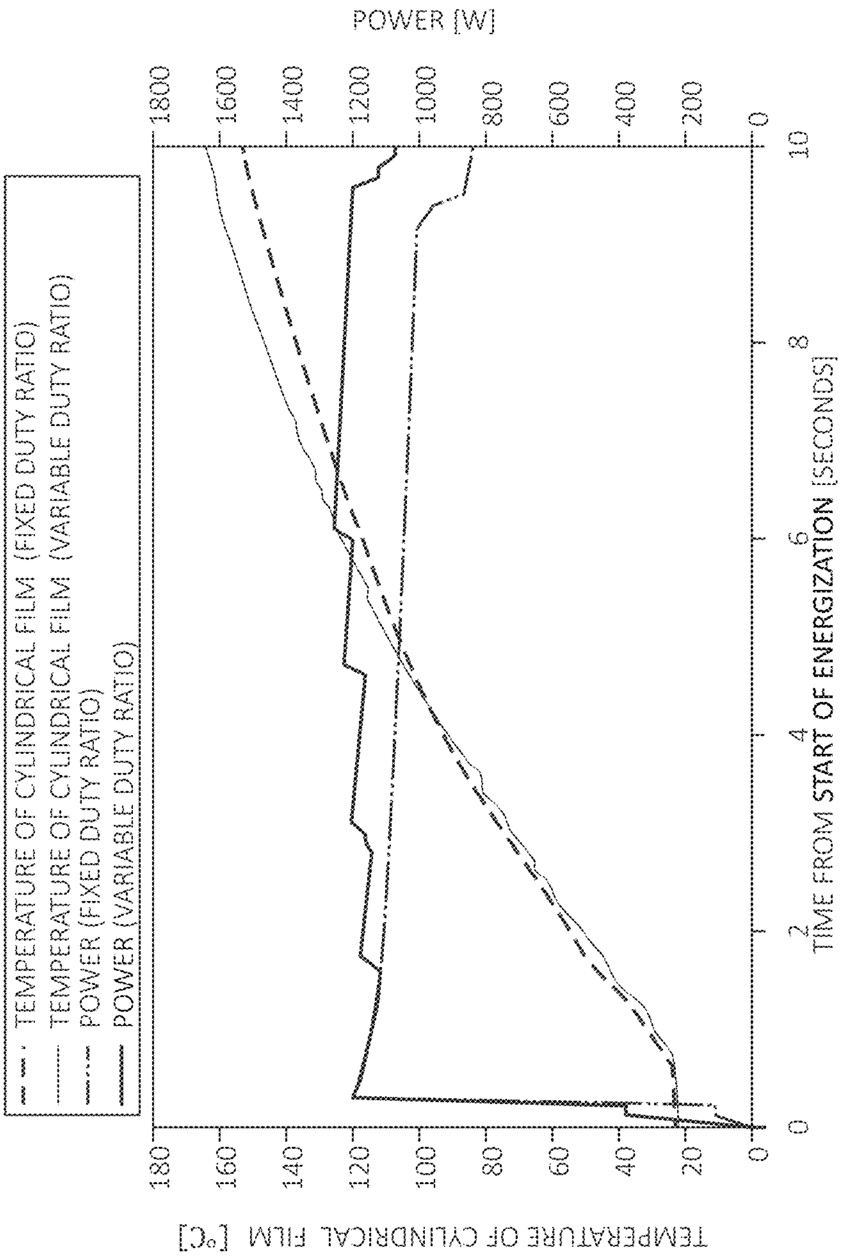
FIG. 12 is a diagram showing an experimental result representing a relationship between elapsed time from a start of energization to a heating element group and temperature of a cylindrical film.

FIG. 12 is a diagram illustrating an example of an experimental result indicating a relationship between elapsed time from start of energization to the heating element group 45 and the temperature of the cylindrical film 35. The horizontal axis in FIG. 12 represents the elapsed time [unit: seconds] from the start of the energization of the heating element group 45. The vertical axis of FIG. 12 represents the temperature [unit: ° C.], and power [unit: W] of the cylindrical film 35.

As shown in FIG. 12, when energization is performed on the heating element group 45 with the normal energization method (that is, an energization method with a fixed duty ratio), power output decreases as a temperature of the TCR material increases. For example, as shown in FIG. 12, the power, which is approximately 1200 W immediately after the start of energization, is reduced to approximately 1000 W approximately after 9 seconds from the start of energization. This power drop is due to characteristics of the TCR material used in heating element group 45. As a result, when energization is performed by the normal energization method for the heating element group 45, as shown in FIG. 11, the rate of rise in the temperature of the cylindrical film 35 decreases as time is elapsed from the start of the energization.

On the other hand, as shown in FIG. 12, when energization is performed with the heating element group 45 in the varying energization method (that is, the energization method with a variable duty ratio) in the start-up processing, the duty ratio of the power is stepped up in increments after a certain period of time (1.5 seconds in the present experiment). This increases the power being used again for a certain period of time. In the present experiment, the energization to the heating element group 45 is started at a duty ratio of 80%, and thereafter, the duty ratio is changed by a total of four times, once after every increment of 1.5 [seconds] at a particular duty ration level, from initially 80%, to 85%, to 90%, to 95%, and then to 100%, respectively. Accordingly, as shown in FIG. 12, the power is raised four times. Accordingly, the decrease in power resulting from any increased resistance of TCR-based heating element group 45 is suppressed.

As shown in FIG. 12, immediately after the start of the energization, approximately 1200 W of power is being used, and this power level is maintained at approximately 1200 W even after approximately 9 seconds from the start of the energization. Due to this, the decrease in the rate of temperature increase of the temperature of the cylindrical film 35 is reduced as compared with the normal energization method.

Figure 13:
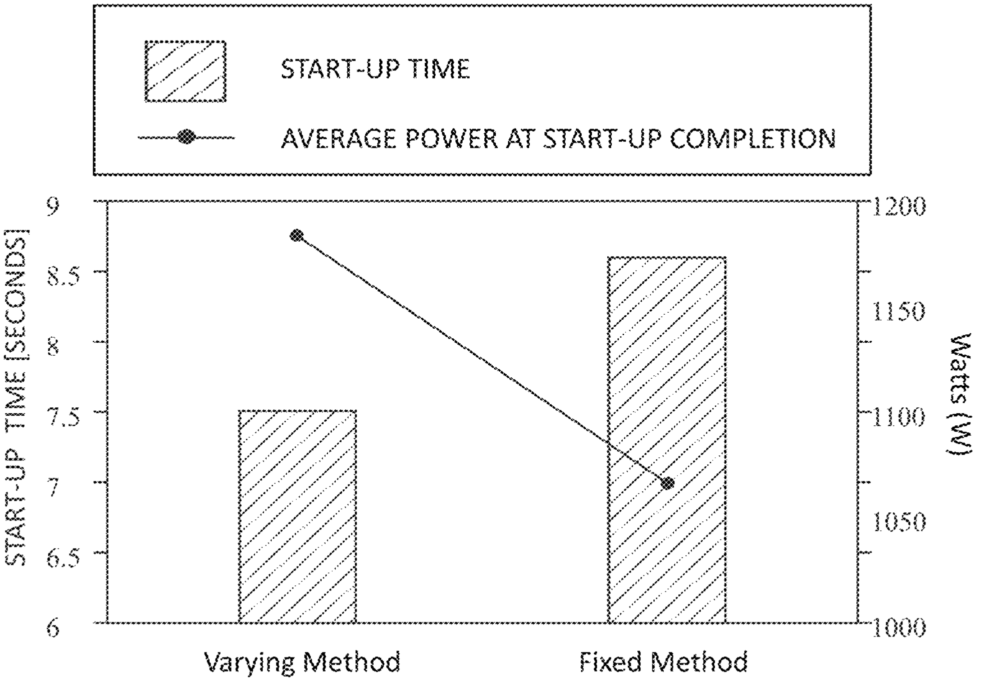
FIG. 13 depicts certain experimental results.

FIG. 13 is a diagram illustrating an example of experimental results. FIG. 13 shows a comparison result between the start-up time and average power at start-up completion when the energization to the heating element group 45 is performed by the normal energization method and the start-up time energization method, respectively.

Here, the "start-up time" is a time required for starting the fixing unit 30 from an idle or reference state. That is, the start-up time is the time required for the cylindrical film 35 to reach the target operating temperature from the start of the energization of the heating element group 45. The "average power at start-up completion" is the average power level used by the fixing unit 30 during the starting (start-up) process of the fixing unit 30 until completed. That is, the average power level used from the initial start time to start-up completion (i.e., when the cylindrical film 35 reaches the target operating temperature).

As shown in FIG. 13, the start-up time in the case where the normal energization method (that is, the energization method with the duty ratio fixed) is used was 8.6 [seconds]. On the other hand, the start-up time in the case where the start-up time (varying) energization method (that is, the energization method with the variable duty ratio) was used in the startup processing was 7.5 [seconds]. In this way, when the start-up time varying energization method during the start-up processing is used, the start-up time is shortened by about 12.8% as compared with the case where the normal energization method is used.

As shown in FIG. 13, the average power at start-up completion when the normal energization method was used was 1067 W. On the other hand, the average power at start-up completion when the start-up time energization method (that is, the duty ratio varying energization method) was 1183 W. As described above, when the varying energization method during the start-up processing is used, the average power at start-up completion is improved (increased) by about 10.9% as compared with the case where the normal energization method is used.

As described above, the image forming apparatus 100 according to the first embodiment includes the heating element group 45, as a heat generating portion, and the controller 6. The heating element group 45 uses a TCR material (that is, a material having a resistance value that increases with an increase in temperature), and generates heat when subjected to energization. The controller 6 changes the duty ratio of the supplied electric power during the heating of the heating element group 45 as the fixing unit 300 is starting up.

With the above-described configuration, the image forming apparatus 100 can change the duty ratio of the power supplied to the heating element group 45 over time. Generally, for a heating element in which the TCR material is used consumed power decreases as the temperature increases (resistance goes up, current goes down). According to this, there is a problem that the time required for starting (heating) of the fixing unit becomes longer when a TCR material is used. On the other hand, the image forming apparatus 100 according to the first embodiment causes the duty ratio of the power to be changed to a higher value, for example, after every increment of a fixed period of time. This allows the image forming apparatus 100 to compensate for the reduced power resulting from the temperature increase after every fixed period of time. That is, the image forming apparatus 100 can avoid (or limit) a decrease in power. Accordingly, the image forming apparatus 100 according to the first embodiment can shorten the time required for the start-up of the fixing unit 300 as compared to the related art.

In general, when the image forming apparatus is starting up, the power usable by a fixing unit may be set in advance. In this case, the heating start-up must be carried out with available set power. On the other hand, with the image forming apparatus 100 according to the first embodiment, it is possible to perform heating while suppressing power consumption after the start-up time.

Figure 16:
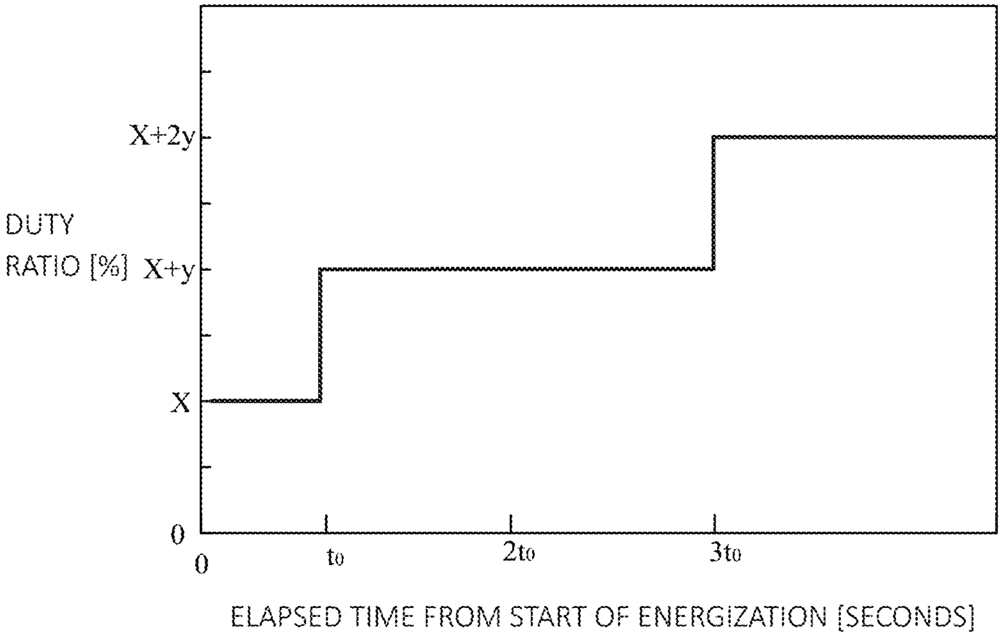
FIG. 16 is a diagram illustrating a change in a duty ratio at varying time intervals.

Note that, in the above-described embodiment, the controller 6 changes the duty ratio of the power to be supplied to the heating element group 45 at a constant time increment (at regular intervals), but the present disclosure is not limited to this. For example, the controller 6 may change or more specifically lengthen the time interval for changing the duty ratio as the time elapses from the start of the energization as depicted in FIG. 16. That is, the frequency at which the duty ratio is varied (increased) may be higher closer to the point in time at which the energization is started. In this case, the decrease in utilized power is suppressed at times close to the time when the energization is started.

Further, for example, the controller 6 may further reduce or alter the change amount of the duty ratio as the time elapses. That is, the duty ratio may be changed by a greater amount at points in time closer to the initial startup time as compared to later in time.

Second Embodiment

Generally, during start-up of the fixing unit, the temperature at the ends, in the width direction, of the cylindrical film 35 may be lower than the temperature at the center of the cylindrical film 35. This is because the center is sandwiched between both ends that are heated similarly to the center, whereas the end is at a position that is heated on only one side.

In the image forming apparatus 100 according to the second embodiment, when the start-up processing start condition is satisfied, the controller 6 energizes the central heating element **45*a*, the first end heating element 45*b*1, and the second end heating element 45*b*2 by an energization method different from each other. When the start-up processing start condition is satisfied, the controller 6 energizes the central heating element 45*a* by a specific, central energization method. The controller 6 energizes the first end heating element 45*b*1 and the second end heating element 45*b*2** by a specific, end energization method.

The central energization method may be any energization method as long as the energization method satisfies the following: the central heating element **45*a*** is energized at a duty ratio of X % at the start of energization, and then is energized at a duty ratio that is changed by x % after every time increment to.

The end energization method may be any energization method as long as the energization method satisfies the following: the first end heating element **45*b*1 and the second end heating element 45*b*2** are energized at the duty ratio of X % at the start of energization, and then are energized at a duty ratio that has been changed by y % after every time increment to. Here, it should be assumed that x<y.

Figure 14:
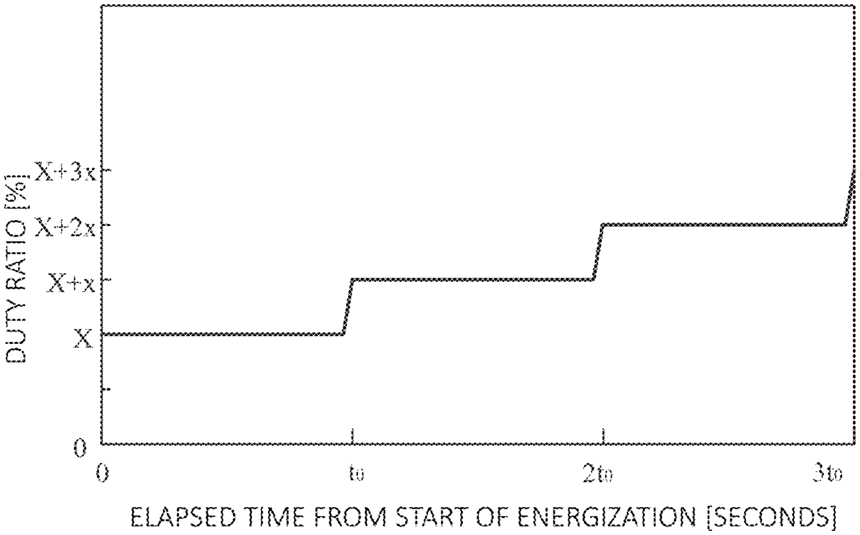
FIG. 14 is a diagram illustrating a change in duty ratio according to a central energization method.

FIG. 14 is a diagram illustrating a change in the duty ratio according to the central energization method. As shown in FIG. 14, at the start of energization (t=0), the energization of the central heating element **45*a*** is started at a duty ratio of X %. After that, the duty ratio is changed to (X+x) % when to seconds have elapsed. After that, the duty ratio is changed to (X+2x) % and (X+3x) % after the lapse of $2t_0$ seconds and the lapse of $3t_0$ seconds, respectively. Note that, when the duty ratio has reached 100%, the duty ratio is not further changed.

Figure 15:
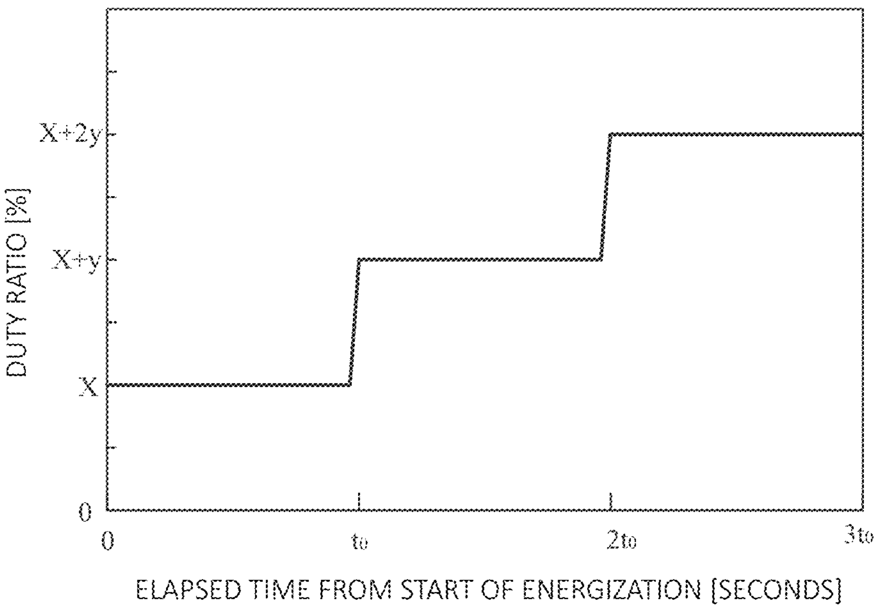
FIG. 15 is a diagram illustrating a change in a duty ratio according to an end energization method.

FIG. 15 is a diagram illustrating a change in the duty ratio according to the end energization method. As shown in FIG. 15, at the start of energization (t=0), the first end heating element **45*b*1 and the second end heating element 45*b*2 both start energizing at the duty ratio of X %. After that, the duty ratio is changed to (X+y) % when to seconds have elapsed. After that, the duty ratio is changed to (X+2y) % after the elapse of $2t_0$ seconds. Note that, when the duty ratio has reached 100%, the duty ratio is not further changed. FIG. 15** illustrates an example in which the duty ratio reaches 100% once 2 to seconds have elapsed. Therefore, the duty ratio is not changed when the elapse of $3t_0$ seconds has elapsed. Note that, as described above, x<y.

As described above, in the image forming apparatus 100 of the second embodiment, when the start-up processing start condition is satisfied, the central heating element **45*a* is energized at a duty ratio that changes by x % after every time increment $t_0$. On the other hand, the first end heating element 45*b*1 and the second end heating element 45*b*2 are energized with a duty ratio that changes by y %, which is greater than x %, after every time increment $t_0$. Accordingly, the first end heating element 45*b*1 and the second end heating element 45*b*2 are relatively more heated/powered than the central heating element 45*a***, but the power is still increased at regular intervals of to seconds.

With the above configuration, the image forming apparatus 100 in the second embodiment can suppress possible differences in temperature at the ends of the cylindrical film 35 and the temperature at the central portion of the cylindrical film 35 when the fixing unit 30 is starting up.

The image forming apparatus 100 in the second embodiment has a configuration in which the increase amount (x) in the duty ratio for the energization to the central heating element **45*a* and the increase amount (y) of the duty ratio for the first end heating element 45*b*1 and the second end heating element 45*b*2 are different from each other. However, the disclosure is not limited thereto, and for example, the image forming apparatus 100 may have a configuration in which the frequency (timer intervals) for changing the duty ratio for energization of the central heating element 45***a* and the first end heating element 45*b*1 and the second end heating element 45*b*2 are different from each other.

Specifically, for example, the duty ratio may be changed every t1 seconds for the central heating element 45*a*, and the duty ratio may be changed for every t2 seconds for the first end heating element 45*b*1 and the second end heating element 45*b*2. Here, it can be assumed that t1>t2 is satisfied. In such a case as this, the increase amount (change increment) for the duty ratio for the central heating element 45*a* and the duty ratio for the first end heating element 45*b*1 and the second end heating element 45*b*2 may be the same as each other.

In this case, the duty ratio of the first end heating element 45*b*1 and the second end heating element 45*b*2 is changed at a timing relatively quicker than that of the central heating element 45*a*. Accordingly, the image forming apparatus 100 according to the second embodiment can suppress the temperature differences between the ends of the cylindrical film 35 the center n of the cylindrical film 35 when the fixing unit 30 is starting up.

The image forming apparatus 100 may also have a configuration in which, for example, the starting duty ratio at the time when energization of the central heating element 45*a* is started and the starting duty ratio at the start of energization of the first end heating element 45*b*1 and the second end heating element 45*b*2 are made different from each other.

More specifically, for example, a configuration may be adopted in which energization is started with a duty ratio of $X_1$% for energization of the central heating element 45*a*, and energization is started with a duty ratio of $X_2$% with respect to energization of the first end heating element 45*b*1 and the second end heating element 45*b*2. Here, $X_1<X_2$ would be satisfied. Note that, in this case, the duty ratio change amount increments for the central heating element 45*a* and for the first end heating element 45*b*1 and the second end heating element 45*b*2 may be the same as each other.

In this case, the first end heating element 45*b*1 and the second end heating element 45*b*2 start to be energized with relatively higher power (that is, with a higher starting duty ration value) than the central heating element 45*a*. Accordingly, the image forming apparatus 100 according to the second embodiment can suppress the temperature differences along the width direction of the cylindrical film 35 when the fixing unit 30 is starting up.

As described above, the image forming apparatus 100 according to the second embodiment includes the heating element group 45 and the controller 6. The heating element group 45 includes the central heating element 45*a* and the first end heating element 45*b*1 and the second end heating element 45*b*2 (which may be referred to collectively as "end heating elements"). The central heating element 45*a*, the first end heating element 45*b*1, and the second end heating element 45*b* each use a TCR material, and generate heat with energization. The central heating element 45*a* is disposed in the center of the heating element group 45. The first end heating element 45*b*1 and the second end heating element 45*b*2 are respectively disposed at opposite ends of the heating element group 45. The controller 6 changes the duty ratio of the electric power to be supplied to the heating element group 45 over time, while the fixing unit 30 is starting up. Here, the controller 6 makes a duty ratio of the electric power supplied to the central heating element 45*a* different (a first duty ratio) from a duty ratio of the electric power supplied to each of the first end heating element 45*b*1 and the second end heating element 45*b*2 (a second duty ratio).

With the above configuration, the image forming apparatus 100 can further increase the duty ratio of the power for energizing the first end heating element 45*b*1 and the second end heating element 45*b*2, for example, to be larger than the increasing width of the duty ratio of the power supplied to the central heating element 45*a*. In this case, more heat is applied to the first end heating element 45*b*1 and the second end heating element 45*b*2 than the central heating element 45*a*. Accordingly, the image forming apparatus 100 can suppress the temperature at the end of the cylindrical film 35 from being lower than the temperature of the center of the cylindrical film 35.

Note that, in the above-described embodiment, the controller 6 makes the duty ratio of the electric power supplied to the central heating element 45*a* and the duty ratio of the electric power supplied to the first end heating element 45*b*1 and the second end heating element 45*b*2 different from each other. However, the present disclosure is not limited to this. For example, the controller 6 may cause the duty ratio of the power for energizing the central heating element 45*a* to be different according to the time interval used for changing the duty ratio of the power for causing the first end heating element 45*b*1 and the second end heating element 45*b*2 to be energized.

For example, the controller 6 may shorten the time interval for changing the duty ratio of the power for energizing the first end heating element 45*b*1 and the second end heating element 45*b*2 to be less the time interval for changing the duty ratio of the power for energizing the central heating element 45*a*. In this case, more heat is applied to the first end heating element 45*b*1 and the second end heating element 45*b*2 than the central heating element 45*a*. Accordingly, the image forming apparatus 100 can prevent the temperature at the end of the cylindrical film 35 from being lower than the temperature of the center of the cylindrical film 35.

Further, for example, the controller 6 may cause the duty ratio at the start of the energization (that is the initial duty ratio value) to be different for the central heating element 45*a* and the first end heating element 45*b*1 and the second end heating element 45*b*2. For example, the controller 6 may set the duty ratio of the electric power for energizing the first end heating element 45*b*1 and the second end heating element 45*b*2 at the time of the start of the energization to be higher than the duty ratio of the electric power supplied to the central heating element 45*a* at the start of the energization. In this case, more heat is applied to the first end heating element 45*b*1 and the second end heating element 45*b*2 than the central heating element 45*a*. Accordingly, the image forming apparatus 100 can prevent the temperature at the end of the end of the cylindrical film 35 from being lower than the temperature of the center of the cylindrical film 35.

Note that, in the above-described embodiments, the heating element group 45 has a configuration in which three heating elements (the central heating elements 45*a*, the first end heating elements 45*b*1, and the second end heating elements 45*b*2) are provided. However, the number of heating elements included in the heating element group 45 may be one or two, or may be four or more.

Note that, in each of the above-described embodiments, heater temperature sensors 62 are configured to include two heater temperature sensors (the central heater temperature sensor 62*a* and the end heater temperature sensor 62*b*). However, the number of the heater temperature sensors 62 may be three or more.

Note that in each of the above-described embodiments, the plurality of thermostats 68 includes two thermostats (the central thermostat 68*a* and the end thermostat 68*b*). However, the number of thermostats 68 may be three or more.

Note that the heating element included in the heating element group 45 may be considered a heating element having a positive resistance temperature characteristic.

Note that the image forming apparatus 100 in each of the above-described embodiments may be a decoloring apparatus. In this case, the heating device is a decoloring unit. A decoloring device performs a process of decoloring (erasing) an image formed on a sheet by a decoloring toner. The decoloring unit decolors a decoloring toner image formed on the sheet passing through a nip by heating the decoloring toner image.

Note that, in each of the above-described embodiments, the cylindrical film 35 is an example of a fixing belt. Further, the heating element group 45 is an example of a heating unit. Further, the central heating element 45*a* is an example of a central heat generating part. Further, the first end heating element 45*b*1 and the second end heating element 45*b*2 are examples of end heat generating parts.

All or part of the functions of the image forming apparatus 100 described as being implemented via software may instead, or in addition to, be realized by using hardware such as an application specific integrated circuit (ASIC), a programmable logic device (PLD), a field programmable gate array (FPGA), and the like. The software program may be recorded in a non-transitory computer-readable recording medium. The computer-readable recording medium is, for example, a portable medium such as a flexible disk, a magneto-optical disk, a ROM, or a CD-ROM, or a storage device such as a hard disk incorporated in a computer system. The program may be transmitted via a telecommunication line.

In the above-described embodiments, the controller 6 is a software-implemented functional unit, but in other examples may be a hardware functional unit such as an LSI or the like.

According to at least one embodiment described above, the image forming apparatus 100 changes the duty ratio of the power supplied to the heating element group 45 over time, and changes the duty ratio of the power to a higher value after every fixed period, so that the consumed power that is reduced due to the characteristics of the TCR material can be increased again for a certain period of time. That is, the image forming apparatus 100 might limit a decrease in power. Accordingly, the image forming apparatus 100 can shorten the time required for starting of the heating apparatus as compared with the related art.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing unit, comprising:

a first resistive heater element that increases in electrical resistance with increases in temperature;

a second resistive heater element on a substrate with the first resistive heater; and a controller configured to:

when a first condition is satisfied, vary a duty ratio of electric power applied to the first resistive heater element for raising the temperature of the first resistive heater element to a target operating temperature, and vary a duty ratio of electric power applied to the second resistive heater element, and when a second condition different from the first condition is satisfied, set a constant duty ratio of electric power applied to the first resistive heater element for raising the temperature of the first resistive heater element to the target operating temperature.

2. The fixing unit according to claim 1, wherein, when the first condition is satisfied, the controller is configured to:

increase the duty ratio of electric power applied to the first resistive heater element by varying duty ratio increments at fixed time intervals, and increase the duty ratio of electric power applied to the second resistive heater element at a second fixed time interval, the first and second fixed time intervals being different from each other.

3. The fixing unit according to claim 1, wherein the first condition is a start-up of the fixing unit from an idle state.

4. The fixing unit according to claim 1, wherein the first condition is a start-up of the fixing unit from an unheated state.

5. The fixing unit according to claim 1, wherein the first condition concerns a heater temperature.

6. The fixing unit according to claim 5, further comprising:

a heater temperature sensor, wherein whether the first condition is satisfied is determined based on the heater temperature measured by the heater temperature sensor being within a predetermined range.

7. The fixing unit according to claim 1, wherein the first condition concerns a film temperature.

8. The fixing unit according to claim 7, further comprising:

a film temperature sensor, wherein whether the first condition is satisfied is determined based on the film temperature measured by the film temperature sensor being within a predetermined range.

9. The fixing unit according to claim 1, wherein the first condition concerns an ambient temperature.

10. The fixing unit according to claim 9, further comprising:

an environment temperature sensor, wherein whether the first condition is satisfied is determined based on the ambient temperature measured by the environment temperature sensor being within a predetermined range.

11. The fixing unit according to claim 1, wherein the second condition is the opposite of the first condition.

12. The fixing unit according to claim 1, wherein the first resistive heater element comprises a TCR material.

13. A fixing unit, comprising:

a first resistive heater element that increases in electrical resistance with increases in temperature;

a second resistive heater element on a substrate with the first resistive heater; and a controller configured to:

when a startup condition is satisfied, vary a duty ratio of electric power applied to the first resistive heater element for raising the temperature of the first resistive heater element to a target operating temperature, and vary a duty ratio of electric power applied to the second resistive heater element, and when the startup condition is not satisfied, set a constant duty ratio of electric power applied to the first resistive heater element for raising the temperature of the first resistive heater element to the target operating temperature.

14. The fixing unit according to claim 13, wherein, when the startup condition is satisfied, the controller is configured to:

increase the duty ratio of electric power applied to the first resistive heater element by varying duty ratio increments at fixed time intervals, and increase the duty ratio of electric power applied to the second resistive heater element at a second fixed time interval, the first and second fixed time intervals being different from each other.

15. The fixing unit according to claim 13, wherein the startup condition is the fixing unit being an idle state when a startup operation of the fixing unit begins.

16. The fixing unit according to claim 13, wherein the startup condition is the fixing unit being in an unheated state when a startup operation of the fixing unit begins.

17. An image forming apparatus for forming an image on a sheet, the apparatus comprising:

an image forming unit configured to form an image on a sheet; and a fixing unit configured to fix the image on the sheet, the fixing unit including:

a first resistive heater element that increases in electrical resistance with increases in temperature;

a second resistive heater element on a substrate with the first resistive heater; and a controller configured to:

when a first condition is satisfied, vary a duty ratio of electric power applied to the first resistive heater element for raising the temperature of the first resistive heater element to a target operating temperature, and vary a duty ratio of electric power applied to the second resistive heater element, and when a second condition different from the first condition is satisfied, set a constant duty ratio of electric power applied to the first resistive heater element for raising the temperature of the first resistive heater element to the target operating temperature.

18. The image forming apparatus according to claim 17, wherein, when the first condition is satisfied, the controller is configured to:

increase the duty ratio of electric power applied to the first resistive heater element by varying duty ratio increments at fixed time intervals, and increase the duty ratio of electric power applied to the second resistive heater element at a second fixed time interval, the first and second fixed time intervals being different from each other.

19. The image forming apparatus according to claim 17, wherein the first condition is a start-up of the fixing unit from an idle state.

20. The image forming apparatus according to claim 17, wherein the first condition is a start-up of the fixing unit from an unheated state.

* * * * *